(12) United States Patent
Igarashi

(10) Patent No.: US 6,804,286 B2
(45) Date of Patent: Oct. 12, 2004

(54) GAS LASER DEVICE

(75) Inventor: Tatushi Igarashi, Oyama (JP)

(73) Assignee: Ushio Research Institute of Technology Inc., Gotenba (JP)

( * ) Notice: Subject to any disclaimer, the term of this patent is extended or adjusted under 35 U.S.C. 154(b) by 227 days.

(21) Appl. No.: 09/778,897

(22) Filed: Feb. 8, 2001

(65) Prior Publication Data

US 2001/0012310 A1 Aug. 9, 2001

(30) Foreign Application Priority Data

Feb. 8, 2000 (JP) .................................... 2000-030748

(51) Int. Cl.$^7$ ................................................ H01S 3/22
(52) U.S. Cl. ................................. 372/58; 372/55
(58) Field of Search ............................. 372/59, 34, 54, 372/63, 64, 58, 55, 57

(56) References Cited

U.S. PATENT DOCUMENTS

| | | | |
|---|---|---|---|
| 4,959,840 A | * 9/1990 | Akins et al. | 372/57 |
| 5,029,177 A | * 7/1991 | Akins et al. | 372/57 |
| 5,033,055 A | * 7/1991 | Akins et al. | 372/57 |
| 5,109,181 A | 4/1992 | Fischer et al. | 313/571 |
| 5,497,049 A | 3/1996 | Fischer | 313/634 |
| 5,771,258 A | 6/1998 | Morton et al. | |
| 5,870,420 A | 2/1999 | Webb | 372/58 |
| 6,018,537 A | * 1/2000 | Hofmann et al. | 372/25 |
| 6,026,103 A | * 2/2000 | Oliver et al. | 372/37 |
| 6,128,323 A | * 10/2000 | Myers et al. | 372/38.1 |
| 6,317,447 B1 | * 11/2001 | Partlo et al. | 372/57 |
| 6,330,261 B1 | * 12/2001 | Ishihara et al. | 372/38.1 |
| 6,337,872 B1 | * 1/2002 | Nara et al. | 372/58 |
| 6,545,430 B2 | 4/2003 | Ono et al. | 315/291 |
| 6,567,450 B2 | * 5/2003 | Myers et al. | 372/55 |

* cited by examiner

Primary Examiner—Don Wong
Assistant Examiner—Tuan N. Nguyen
(74) Attorney, Agent, or Firm—Nixon Peabody LLP; David S. Safran

(57) ABSTRACT

There is provided an excimer laser device capable of producing a stable oscillation even at a high repetition rate of 4 kHz. This gas laser device is comprised of a laser chamber having laser gas filled therein; a pair of main discharge electrodes arranged in the laser chamber; a cross-flow fan for circulating the laser gas within the laser chamber at least between the main discharge electrodes; and a diameter of the cross-flow fan is 150 mm or less, its peripheral speed being 25.0 m/s or more.

4 Claims, 3 Drawing Sheets

| Fan diameter (mm) | 95 | 100 | 110 | 120 | 130 | 140 | 150 |
|---|---|---|---|---|---|---|---|
| Minimum number of rotations of fan where no downstream arcing is generated. (m/s) | 5050 | 4800 | 4340 | 4000 | 3700 | 3410 | 3200 |
| Minimum peripheral speed of fan where no downstream arcing is generated. (m/s) | 25.1 | 25.1 | 25.0 | 25.1 | 25.2 | 25.0 | 25.1 |
| Minimum number of rotations of fan under a stable electrical discharge (rpm) | 5450 | 5150 | 4700 | 4300 | 4000 | 3700 | 3450 |
| Minimum peripheral speed of fan under a stable electrical discharge (m/s) | 27.1 | 27.0 | 27.1 | 27.0 | 27.2 | 27.1 | 27.1 |

Fig.2

GAS LASER DEVICE

BACKGROUND OF THE INVENTION

1. Field of the Invention

This invention relates to a cross-flow fan used for circulating gas in a gas laser device, and more particularly a cross-flow fan used in an ArF excimer laser device and a fluorine ($F_2$) laser device.

2. Description of the Related Art

As semiconductor circuits are made smaller and more highly integrated there is a demand for projection exposure devices with an improved resolution. It has therefore been promoted to attain short wavelength exposure light emitted from an illumination source and, as the illumination source for semiconductor lithography, a gas laser device such as an excimer laser device or fluorine laser device and the like for emitting light having a shorter wavelength than the discharge wavelength of a prior art mercury lamp has been employed.

In the excimer laser device, laser gas composed of fluorine ($F_2$), argon (Ar) and rare gases such as neon (Ne) acting as buffer gas is filled with several hundred kPa within a laser chamber, for example. In the fluorine laser device, laser gas composed of fluorine ($F_2$) and rare gas such as helium (He) acting as buffer gas is similarly filled in the laser chamber with several hundred kPa. Further, there are provided a pair of main discharge electrodes. A high voltage is applied to the main discharge electrodes to generate discharge whereby the laser gas acting as laser medium is excited.

An output mirror and an optical system for narrowing the bandwidth and generating a narrow spectral width of the laser beam and stabilizing the wavelength of the main wavelength is arranged in front or rear of the laser chamber, respectively. A laser resonator is constituted by an output mirror and the optical system for narrowing the bandwidth. When the laser gas is excited the light emitted from the chamber is amplified by the laser resonator and then emitted from the output mirror as the laser beam.

In this case, the gas laser device acting as the light source for exposure is operated such that one light emitting operation is performed every time one discharge operation is carried out between the main discharge electrodes, and upon completion of this one-time exposure the laser medium between the electrodes becomes rather non-uniform regarding its constitution or density. Therefore, in order to start a subsequent discharge, fresh laser medium must be provided between the main electrodes. That is, when the discharge is started while the laser medium is non-uniform an arc discharge may easily be produced, a uniform glow discharge required for laser oscillation cannot be attained and the problem of an unstable output may occur.

In recent years, the repetition rate of the laser oscillation required in the laser device, i.e. the number of times of oscillation per unit of time, has become high and, in the device itself, it is necessary to replace the said gas rapidly.

In the prior art devices, a cross-flow fan has been used as a gas circulation fan in a gas laser device such as an excimer laser device and a fluorine laser device. In one example of these devices, the gas flow rate between the electrodes is about 10 m/s and the number of rotations per minute of the fan to attain the flow rate is about 1000 (rpm) in an excimer laser device for exposure with a repetition rate of 1 kHz, depending on the internal structure of the laser chamber (such as the distance between the electrodes and the position of the pre-ionization means).

In addition, in case of an excimer laser device having a repetition rate of 2 to 3 kHz, the gas flow rate that has to be provided between the electrodes is about 20 to 30 m/s and the number of rotations of the fan for attaining the flow rate has to be about 2000 to 3000 rpm.

Such a prior art device as described above was adapted to the required repetition rate merely by applying means for increasing the number of rotations of the fan. However, in recent years, higher repetition rates such as 4 kHz have become necessary, and a mere increase of the number of rotations of the fan as proposed in the prior art could not provide the desired results.

Therefore, there has been a strong need for developing a gas laser device for exposure satisfying the mentioned requirements.

SUMMARY OF THE INVENTION

It is an object of the present invention to provide means, so far not known in the prior art, capable of achieving a stable oscillation even in a gas laser device having a high repetition rate of 4 kHz or more.

In order to attain the said object, the gas laser device of the present invention is an excimer laser device with a repetition rate of 4 kHz or more which comprises a laser chamber having laser gas filled therein, a pair of main discharge electrodes arranged in the laser chamber, a cross-flow fan for circulating laser gas at least between the main discharge electrodes within the laser chamber, and a bearing structure for rotatably supporting the cross-flow fan, wherein a diameter of the cross-flow fan is 150 mm or less and a peripheral speed is 25.0 m/s or more.

Further, the aforesaid peripheral speed is preferably 27.0 m/s or more.

In a preferred embodiment, the aforesaid bearing structure comprises a roller or ball bearing wherein the number of rotations is 4500 rpm or less, and further in the case that the bearing structure is a magnetic bearing, the number of rotations is 5000 rpm or less.

As described above, in order to perform a stable laser oscillation with a high repetition rate, it is necessary to quickly remove old gas remaining around the electrodes after completion of one discharge from the electrodes and to quickly provide new gas between the electrodes.

One of the methods for enhancing this capability may be to narrow the width of the electrode (the width in a direction where gas is circulated). Shortening of the width of the electrode results in narrowing the distance width in the glow discharge generated between the electrodes. In this case, the space for removing residual gas becomes small so that a high clearing rate becomes possible as well. However, the glow distance width is restricted by the desired optical output of the illumination source and its lifetime. Therefore, in the case of illumination sources of the exposure devices for semiconductor integrated circuits, the gap cannot be made unlimitedly short. It can be said that a lower limit of this numerical value is normally 3 to 4 mm.

Another method consists in increasing the gas circulating rate (gas velocity) between the electrodes. The technology related to this proposal is disclosed in Japanese Patent LaidOpen No. Hei 10-223955 corresponding to U.S. Pat. No. 5,771,258. This prior art provides a system in which the amount of gas bypassing the discharge region is restricted as much as possible, components preventing the flow in the gas circulating passage are eliminated as much as possible, and undesired disturbances of gas are eliminated to smoothen the flow. Although such a technology as above is of course necessary, the aim of this prior art is to eliminate some of the causes decreasing velocity but not to positively increase the flow speed. Further, the prior art aims at repetition rates of about 1 kHz, but high repetition rates of 4 kHz or more in the present invention require a new technology increasing the flow speed itself.

In view of the foregoing, the method for positively increasing the flow speed of the circulated gas consists in improving the characteristics of the cross-flow fan (a lateral flow fan). This cross-flow fan is normally used in "open air" such as found in an indoor air conditioner, and studies about the characteristics increasing the gas velocity in a high pressure closed container as found in a gas laser device such as an excimer laser device to which the present invention is directed have not sufficiently been performed.

The present inventor has found characteristics of fans capable of satisfying the condition of a high repetition rate of 4 kHz or more in the specific environment of gas laser device with a high pressure closed container such as an excimer laser device and a fluorine laser device and the like. More particularly, the present inventor has extensively investigated the relation between the fan diameter and the number of rotations of the fan.

As described above, the gas laser device of the present invention has a fan outer diameter of 150 mm or less and the peripheral speed of the fan is 25 m/s or more so that it can provide a laser device which can stand high repetition rates of 4 kHz or more. In particular, the present invention has found conditions that can be applied to an environment specific to gas lasers with high pressure closed containers employing a cross-flow fan used in the prior art in open air-conditions such as an air conditioner and has adapted its utilization to high repetition rates of 4 kHz or more, which was said to be impossible in the prior art.

BREIF DESCRIPTION OF THE DRAWINGS

FIG. 1 schematically shows the internal structure of an excimer laser device.

FIG. 2 shows a relation between a fan outer diameter and the number of rotations of the fan.

DETAILED DESCRIPTION OF THE INVENTION

Figure 1:
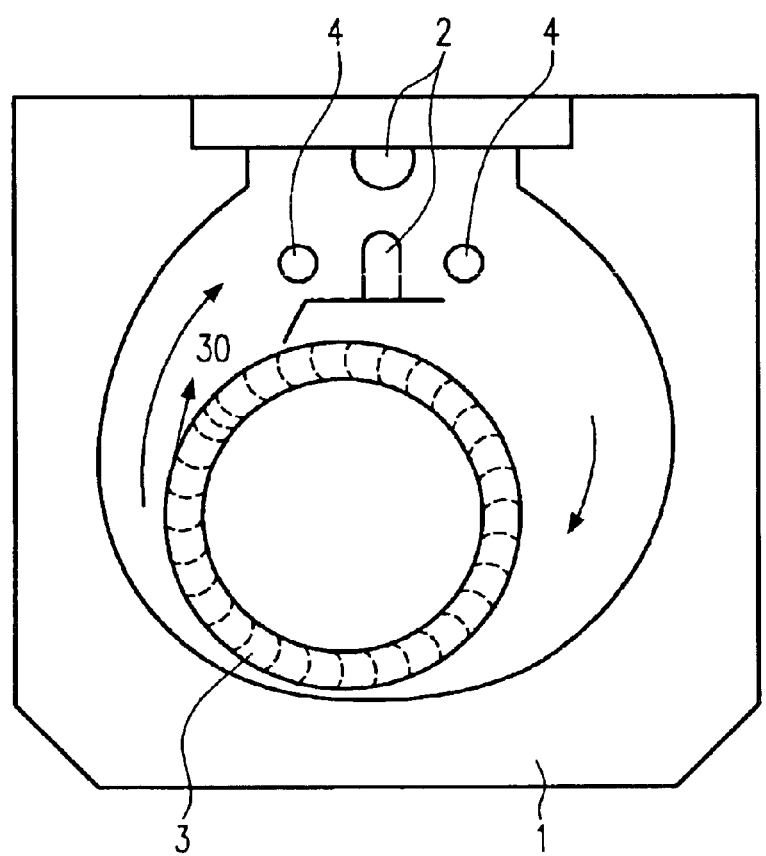

FIG. 1 shows a cross-sectional view of an excimer laser device. A laser chamber 1 consists of a housing, and main discharge electrodes 2 composed of an anode and a cathode are spaced apart and arranged in the housing. A glow discharge is repeated at the main discharge electrodes 2 and a laser beam is emitted from a window (not shown).

In addition, a cross-flow fan 3 is arranged in the chamber 1. This cross-flow fan is of a hollow cylindrical shape in which a plurality of blades are arranged in a circumferential direction between circular side plates and similarly extend with a similar equal length in an extending direction of the main discharge electrodes 2. The fan is rotated in a clockwise direction as shown in the drawing to cause the gas to circulate in the direction indicated by the arrows. This cross-flow fan is rotatably supported by a bearing structure (not shown), in particular, a roller bearing.

The laser chamber 1 is filled with fluorine ($F_2$), argon gas (Ar) and neon (Ne) acting as buffer gas or the like. These gases are circulated by the fan 3. When a high voltage pulse is applied to the main discharge electrodes 2, these gases are excited to generate discharge light, and new gas is provided again by circulation between the electrodes until the discharge light emitting state occurs together with application of a subsequent high voltage pulse.

Reference number 4 denotes a pre-ionization unit. The pre-ionization unit 4 irradiates ultraviolet light onto the new laser gas between the electrodes before the high voltage pulse is applied to the main discharge electrodes 2. The new laser gas is pre-ionized in advance through this radiation of the ultraviolet light, and when a main discharge is produced in the gas a uniform glow discharge is generated at the elongated electrodes.

The present inventor performed experiments to check the stability of discharge generated at the main discharge electrodes 2 by changing the outer diameter of the cross-flow fan 3 in the chamber 1. In the experiment, seven cross-flow fans having outer diameters of 95, 100, 110, 120, 130, 140 and 150 (mm), respectively, were used, and the inventor measured the minimum number of rotations of each of the cross-flow fans where downstream arcing is not generated and the minimum number of rotations of each of the cross-flow fans when a quite stable discharge is generated.

The downstream arcing in this case is defined as a discharge not desired for laser oscillation generated under an influence of the residual gas at the downstream sides of the electrodes (against the gas circulating direction) in a subsequent discharge when the residual gas has not sufficiently been removed from between the electrodes after a discharge has been generated between the electrodes.

The present inventor calculated the peripheral speed (denoted 30 in FIG. 1, i.e. the speed at the circumferential edge in a tangential direction) with reference to the minimum number of rotations of the cross-flow fan where downstream arcing is not observed and the outer diameter of the fan. He similarly calculated the peripheral speed with reference to the number of rotations of the fan under a stable discharge and the outer diameter of the fan at that time. The results of these experiments are shown in FIG. 2. The outer diameter of the cross-flow fan cannot be made too great. Since the excimer laser device of 4 kHz is mounted in a clean room for a semiconductor manufacturing process its installation area is remarkably limited. It is restricted by the volume of the laser chamber or the like, and a maximum value of the fan outer diameter is 150 mm. Further, the distance width is also limited to 3 to 4 mm in view of the required output, the degree of output stability and the lifetime of the excimer laser device of 4 kHz. Moreover, the distance between the electrodes is also limited to 15 to 17 mm for similar reasons. In the present invention, the relation between the number of rotations of the fan and the fan outer diameter has been studied in a range of conditions required in an excimer laser device of 4 kHz.

It is apparent from the results of the experiments shown in FIG. 2 and the peripheral speed calculated in view of the results that a peripheral speed of 25.0 m/s is the minimum required value with respect to downstream arcing and a peripheral speed of 27.0 m/s or more is needed in order to keep the discharge stable. That is, in the present invention, the relation between the fan outer diameter and the rotational speed is specified by the factor of the peripheral speed in view of a stable glow discharge within a practical application range of the excimer laser device, and this numerical value range is at least 25.0 m/s.

The present inventor also studied the maximum number of rotations of the fan (per minute). As described above, since increasing the number of rotations of the fan enables the gas flow speed to be increased, it can be adapted to high repetition rates. However, when the number of rotations unnecessarily is too high it generates vibration leading to increased vibration of the line narrowing unit for narrowing the laser bandwidth and resulting in deterioration of the degree of wavelength stability. In addition, it is generally known that a bearing structure is employed for driving the rotating fan relative to the purity of gas in order to circulate the filled gas within the chamber. However, this bearing does not work well if the number of rotations of the fan is increased.

In view of the above, the present inventor also studied the maximum number of rotations of the fan with reference to the degree of stability of the laser beam and the workability of the bearing.

Figure 3:
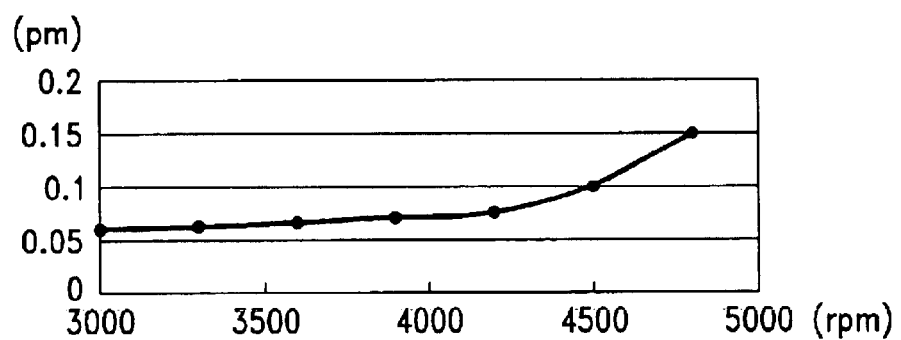
FIG. 3 shows the number of rotations of the fan and the degree of wavelength stability in the case that a roller bearing is used.

First, regarding the degree of the wavelength stability of the laser beam, the number of rotations of the fan per one minute is changed between 3000, 3300, 3700, 3900, 4200, 4500 and 4800 rpm, respectively, and the wavelength of the oscillating laser beam at each of the number of rotations was measured. The results of this experiment are shown in FIG. 3. The ordinate denotes the degree of the wavelength stability of the laser beam, i.e. the maximum lateral deviation of the wavelength from the desired oscillating wavelength, and the abscissa denotes the number of rotations of the fan. The fan in this experiment is one that is rotatably supported on a roller bearing. With reference to the figure, it is assumed that a reason why a deviation occurs consists in the fact that a vibration is generated due to an increased number of rotations, i.e. an increased rotational speed, leading to a small deviation of the wavelength. In this case, it is demanded of the characteristics of the exposure device that the degree of stability of the wavelength be 0.1 pm or less. If this value exceeds 0.1 pm problems will arise.

The practical studies in view of the foregoing led to the understanding that when the number of rotations of the fan is 4800 rpm the degree of wavelength stability exceeded 0.1 pm. The operation could be carried out with a stabilized wavelength up to 4500 rpm for the number of rotations of the fan. The experiment was carried out for fan outer diameters of 95 to 150 mm and substantially similar results were obtained for all kinds of fan diameters.

The present invention will be described with regard to the bearing structure.

First, the number of rotations of the fan and the lifetime of the bearing were studied using a roller bearing as a bearing structure. In the case that the number of rotations of the fan was 4500 rpm and one discharge corresponded to 1 pulse, it was possible to continue a superior operation up to $5 \times 10^9$ pulses, although in case of a number of rotations of 4800 rpm or more a superior operation could be performed at those number of rotations with only $2 \times 10$ pulses or less. This is due to an increased amount of grease consumption in the roller bearing, and $2 \times 10^9$ pulses are not acceptable in the semiconductor manufacturing stage.

It can be taken from the mentioned results the maximum number of rotations of the cross-flow fan using a roller bearing is up to 4500 rpm.

It is preferable that the roller bearing is made of ceramics such as zirconia, silicon nitride and alumina or the like. This is due to the fact that the ceramics do not react with fluorine and even if the substances generated after discharge enter the bearing the material itself is hard and wear is negligible. Due to this fact, as indicated in the lifetime experiment described above, even if grease is consumed the bearing may be more durable against wear.

Now, a case where the bearing structure is not a roller bearing but a magnetic bearing will be described. The experiment relative to the number of rotations of the fan (rpm) and the degree of wavelength stability shown in FIG. 3 was repeated while the roller bearing was replaced by a magnetic bearing as the bearing structure. The number of rotations being changed between 3100, 3400, 3700, 4000, 4350, 4600, 5000 rpm and 5000 rpm or more.

The magnetic bearing as used herein means a non-contact type structure where the rotating shaft of the fan is held above the bearing by magnetic action. The results of this experiment are shown in FIG. 4.

Figure 4:
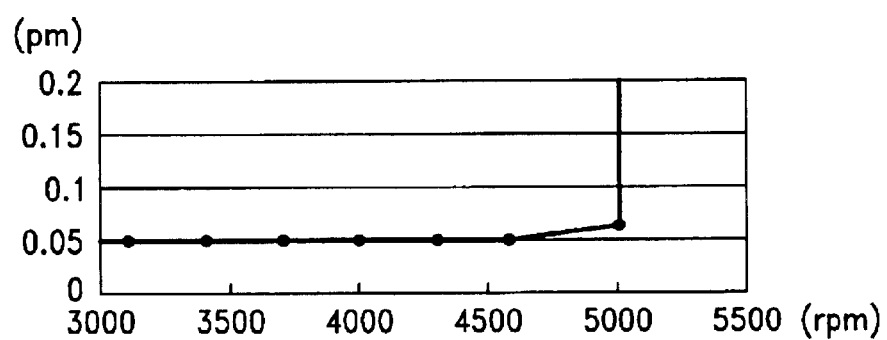
FIG. 4 shows the number of rotations of the fan and the degree of wavelength stability in the case that a magnetic bearing is used.

As is apparent from FIG. 4, even if the number of rotations of the fan per minute is increased up to 5000 rpm, the degree of wavelength stability is as high as 0.06 pm. In comparison with the case in which a roller bearing is used the use of a magnetic bearing avoids contact of the rotating shaft with the bearing presumably resulting in that vibrations are not transferred to it. However, if the number of rotations exceeds 5000 rpm contact between the rotating shaft and the bearing occurs and this may lead to problems in wavelength stability.

In addition, since the magnetic bearing does not require any grease, contrary to the roller bearing, it can be confirmed that, regarding its lifetime, $5 \times 10^9$ pulses or more can be used up to 5000 rpm.

That is, when a magnetic bearing is employed as the bearing structure, it can be concluded that a number of rotations up to 5000 rpm is available regarding the wavelength stability of the laser beam and the lifetime of the bearing.

Although the invention has been described for preferred embodiments using an arf excimer laser device it can also be applied in a similar manner to a fluorine laser device.

What is claimed is:

1. A gas laser device having a repetition rate of 4 kHz or more comprising:
   a laser chamber having laser gas filled therein:
      a pair of main discharge electrodes oppositely arranged in the laser chamber and spaced apart by a predetermined distance;
      a cross-flow fan located within the laser chamber for circulating the laser gas within the laser chamber at least between the main discharge electrodes; and
      a bearing structure for rotatably supporting the cross-flow fan,
   wherein a diameter of the cross-flow fan is 130 to 150 mm and a peripheral speed thereof is 25.0 m/s or more.

2. The gas laser device according to claim 1, wherein the peripheral speed of said cross-flow fan is 27.0 m/s or more.

3. The gas laser device according to claim 1, wherein said bearing structure is a roller bearing adapted for being rotated at 4500 rpm or less.

4. The gas laser device according to claim 1, wherein said bearing structure is a magnetic bearing adapted for being rotated at less than 5000 rpm.

* * * * *